United States Patent
Nique et al.

(10) Patent No.: US 10,767,755 B2
(45) Date of Patent: *Sep. 8, 2020

(54) PLANETARY GEARING AND PLANET PIN FOR A PLANETARY GEARING

(71) Applicants: Rolls-Royce Deutschland Ltd & Co KG, Blankenfelde-Mahlow (DE); Rolls-Royce plc, London (GB)

(72) Inventors: Michael Nique, Berlin (DE); Paul Gorenz, Berlin (DE); Christopher Campbell, Berlin (DE); Frank Wagner, Bruchsal (DE); Mark Spruce, Bristol (GB); Daren Ashmore, Nottingham (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,327

(22) Filed: Nov. 21, 2018

(65) Prior Publication Data
US 2019/0162294 A1    May 30, 2019

(30) Foreign Application Priority Data
Nov. 24, 2017    (DE) .................. 10 2017 127 876

(51) Int. Cl.
*F16H 57/08*    (2006.01)
*F02C 7/36*    (2006.01)
(Continued)

(52) U.S. Cl.
CPC ............ *F16H 57/08* (2013.01); *F01D 25/18* (2013.01); *F02C 7/36* (2013.01); *F16C 17/02* (2013.01);
(Continued)

(58) Field of Classification Search
None
See application file for complete search history.

(56) References Cited

U.S. PATENT DOCUMENTS

| 1,425,430 A | 8/1922 | Ragnar et al. |
| 2,127,463 A * | 8/1938 | Chilton ................. F16H 1/2836 475/347 |

(Continued)

FOREIGN PATENT DOCUMENTS

| CN | 201396406 Y | 2/2010 | |
| CN | 202082374 U * | 12/2011 | ............. F16H 57/04 |

(Continued)

OTHER PUBLICATIONS

German Search Report dated Sep. 11, 2018 from counterpart German App No. 10 2017 127 866.4.

(Continued)

*Primary Examiner* — Dirk Wright
(74) *Attorney, Agent, or Firm* — Shuttleworth & Ingersoll, PLC; Timothy J. Klima

(57) ABSTRACT

A planetary gearing includes a sun gear rotating about a rotation axis and driven by a sun shaft; planet gears driven by the sun gear; a ring gear engaging the planet gears; and a plurality of planet pins that respectively include an outerside abutment surface having an axially forward end and an axially rearward end. Respectively, one planet pin is arranged inside a planet gear, and the planet pin and the planet gear form a lubricated journal bearing. At an axially forward face side and/or axially rearward face side, each planet gear forms a recess that extends inside the planet gear starting from the face side. The planet pins respectively form a crowning at their abutment surface such that their outer (Continued)

diameter decreases from a maximum outer diameter towards at least one axial end of the abutment surface, and has a minimum at the axial end.

20 Claims, 13 Drawing Sheets

(51) Int. Cl.
- *F16H 57/04* (2010.01)
- *F16C 33/10* (2006.01)
- *F16C 17/02* (2006.01)
- *F16C 23/04* (2006.01)
- *F16H 1/28* (2006.01)
- *F01D 25/18* (2006.01)

(52) U.S. Cl.
CPC ........ *F16C 23/045* (2013.01); *F16C 33/1025* (2013.01); *F16H 1/28* (2013.01); *F16H 1/2836* (2013.01); *F16H 57/0479* (2013.01); *F05D 2260/40311* (2013.01); *F05D 2260/98* (2013.01); *F16C 2360/24* (2013.01); *F16C 2361/61* (2013.01); *F16H 2057/085* (2013.01)

(56) References Cited

U.S. PATENT DOCUMENTS

| | | | |
|---|---|---|---|
| 2,498,295 A | 2/1950 | Peterson et al. | |
| 2,547,877 A * | 4/1951 | Lucia | F16H 1/2836 |
| | | | 475/346 |
| 2,749,778 A * | 6/1956 | Kuhn | F16H 1/2836 |
| | | | 475/347 |
| 2,932,992 A | 4/1960 | Larsh et al. | |
| 2,936,655 A * | 5/1960 | Peterson | F16H 1/2809 |
| | | | 475/347 |
| 3,257,869 A | 6/1966 | Sharples et al. | |
| 3,355,789 A | 12/1967 | Clifford et al. | |
| 3,363,413 A | 1/1968 | Jones et al. | |
| 3,425,301 A | 2/1969 | Shannon et al. | |
| 4,104,932 A | 8/1978 | Hansson | |
| 4,271,928 A | 6/1981 | Northern | |
| 4,384,498 A | 5/1983 | Eichinger | |
| 5,098,358 A | 3/1992 | Igaku | |
| 5,518,319 A * | 5/1996 | Selby | F16C 17/10 |
| | | | 384/100 |
| 6,964,155 B2 | 11/2005 | McCune et al. | |
| 8,075,190 B1 * | 12/2011 | Wadehn | F16C 32/0685 |
| | | | 384/100 |
| 8,205,432 B2 | 6/2012 | Sheridan | |
| 8,262,535 B2 | 9/2012 | Klingels | |
| 8,313,412 B2 * | 11/2012 | Montestruc | F16H 1/2836 |
| | | | 475/346 |
| 8,333,678 B2 | 12/2012 | McCune | |
| 8,790,213 B1 | 7/2014 | Isayama et al. | |
| 8,899,916 B2 | 12/2014 | McCune et al. | |
| 10,047,792 B2 | 8/2018 | Guettler | |
| 2003/0236148 A1 | 12/2003 | Fox | |
| 2004/0192491 A1 | 9/2004 | Becquerelle et al. | |
| 2004/0259679 A1 | 12/2004 | Becquerelle et al. | |
| 2005/0075211 A1 | 4/2005 | Fox et al. | |
| 2009/0111639 A1 | 4/2009 | Klingels | |
| 2010/0197445 A1 | 8/2010 | Montestruc | |
| 2015/0300255 A1 | 10/2015 | Gallet et al. | |
| 2015/0323056 A1 | 11/2015 | Sheridan | |
| 2016/0097331 A1 | 4/2016 | Venter et al. | |
| 2016/0201793 A1 | 7/2016 | Muldoon | |
| 2016/0341248 A1 | 11/2016 | Guettler et al. | |
| 2017/0261095 A1 | 9/2017 | Littlefield et al. | |
| 2019/0162292 A1 * | 5/2019 | Nique | F02C 7/36 |
| 2019/0162293 A1 * | 5/2019 | Nique | F01D 25/18 |
| 2020/0011411 A1 | 1/2020 | Gilliland et al. | |

FOREIGN PATENT DOCUMENTS

| | | | |
|---|---|---|---|
| DE | 66534 A1 | 4/1969 | |
| DE | 2235448 A1 | 2/1974 | |
| DE | 2648154 A1 | 5/1977 | |
| DE | 2925964 A1 | 1/1980 | |
| DE | 2843459 A1 | 4/1980 | |
| DE | 289318 A5 | 4/1991 | |
| DE | 10318945 B3 | 10/2004 | |
| DE | 602004001476 T2 | 2/2007 | |
| DE | 102005054088 A1 | 5/2007 | |
| DE | 102007031726 A1 | 1/2009 | |
| DE | 102013221265 A1 | 5/2015 | |
| DE | 102015221633 A1 | 5/2017 | |
| DE | 102016124738 A1 | 6/2018 | |
| EP | 0188616 A1 | 7/1986 | |
| EP | 1028275 A2 | 8/2000 | |
| EP | 1649191 A1 | 4/2006 | |
| EP | 2518296 A2 | 10/2012 | |
| SU | 533779 * | 10/1976 | ............... F16H 1/28 |
| WO | 2013106879 A1 | 7/2013 | |

OTHER PUBLICATIONS

German Search Report dated Sep. 13, 2018 from counterpart German App No. 10 2017 127 874.5.
German Search Report dated Sep. 19, 2018 from counterpart German App No. 10 2017 127 876.1.
European Search Report dated Apr. 10, 2019 for related Euroepan Patent Application No. 18206995.5.
European Search Report dated Mar. 15, 2019 for counterpart European Patent Application No. 18207036.7.
European Search Report dated Mar. 14, 2019 for related European Patent Application No. 18206982.3.

* cited by examiner

PLANETARY GEARING AND PLANET PIN FOR A PLANETARY GEARING

This application claims priority to German Patent Application DE102017127876.1 filed Nov. 24, 2017, the entirety of which is incorporated by reference herein.

Disclosed is a planetary gearing and a pin for such a planetary gearing.

Planetary gearings are generally known. Among other things, they are used in gear fan engines to provide a gear reduction between a turbine shaft coupled with a turbine and a fan shaft coupled with a fan.

US 2015/0300255 A1 describes a planetary gearing of a gear fan engine in which cylindrical planet pins are respectively arranged in planet gears that are driven by a sun gear and rotate in a stationary ring gear, forming a lubricated journal bearing to the planet gear. The planet pins are connected to a torque carrier that is coupled to a fan shaft. Further, it is disclosed that the planet pins can be provided with recesses at their ends.

In gear fan engines, planetary gearings are exposed to very high centrifugal forces and torques that deform the planet pin and the planet gear and can influence the lubricating film in the slide bearing between these two elements, whereby the functionality of the slide bearing is compromised. In particular, the cylindrical planet pin that is affixed at its ends in support plates is subject to bending as a result of the occurring forces, due to which the thickness of the lubricating film increases in the center of the planet pin and is reduced at the ends of the planet pin, which leads to an increased lubricating film pressure at the ends of the planet pin and to the danger of a metal-on-metal contact occurring between the planet pin and the planet gear. As a result, the planet pin is subject to strong loads and wear on its ends.

These loads and wear can be reduced through an improved stiffness of the planet pin. However, the increase in the wall thickness of the planet pin that is necessary for this purpose results in increased weight, which is disadvantageous when used in aeronautical applications.

The present invention is based on the objective of providing a planetary gearing with a low-wear planet pin as well as a pin for such a planetary gearing.

This objective is achieved through a planetary gearing and a pin with features as disclosed herein. Further embodiments are also disclosed herein.

Accordingly, the invention regards a planetary gearing that comprises a sun gear, a plurality of planet gears, a ring gear, and a plurality of planet pins. The sun gear rotates about a rotation axis of the planetary gearing and is driven by a sun shaft. Here, the rotation axis of the planetary gearing defines an axial direction of the planetary gearing. The planet gears are driven by a sun gear and are in engagement with the ring gear. The planet pins respectively have an outer-side abutment surface that comprises an axially forward end and an axially rearward end. A planet pin is respectively arranged in an axial opening of a planet gear. The planet pin and the planet gear form a lubricated journal bearing, wherein the adjoining contact surfaces of the slide bearing are separated from each other by a slide bearing gap.

In the present invention, it is provided that the planet pins form a crowning at their outer-side abutment surface, namely in the sense that, from a maximum outer diameter, their outer diameter decreases towards at least one axial end of the abutment surface and has a minimum at the axial end. Here, the abutment surface of the planet pin formed with a crowning forms a contact surface of the slide bearing that the planet pin forms with the planet gear.

The solution according to the invention is based on the idea of not forming the planet pin in a cylindrical manner, but rather to provide it with a crowning which results in the outer diameter of the planet pin being minimal at least at one axial end of the abutment surface. In this manner, an enlarged slide bearing gap and consequently also an enlarged lubricating film thickness is provided at least at one end of the abutment surface. As a result, when deformations and vibrations as caused by the centrifugal forces and the introduced torques occur during operation at the ends of the abutment surface, the lubricating film thickness remains sufficiently great at least at one axial end of the abutment surface to avoid excessive lubrication film pressure and the danger of a metal-on-metal contact between the planet pin and the planet gear.

Through the invention, the slide bearing is optimized in that during operation contact surfaces that are aligned in parallel are also provided at the axial ends of the slide bearing. The lubricating film thickness has smaller thickness variations across it axial length. Here, the mentioned advantages are achieved without increasing the wall thickness of the planet pin. Instead, even a certain weight reduction can be achieved, since the crowning of the abutment surface may be obtained by removing material towards the axial ends of the abutment surface.

In one embodiment of the invention, it is provided that the planet pins form a crowning at their abutment surface in such a manner that their outer diameter decreases towards both axial ends of the abutment surface and has a minimum at both axial ends. In particular, it can be provided that the planet pin has the minimum outer diameter at both axial ends of the abutment surface, and has the maximum outer diameter between the axial ends, wherein the minimum outer diameters can be identical or differing at the two ends. Here, the difference between the maximum outer diameter and the minimum outer diameter at the one end of the abutment surface defines the crowning between the maximum outer diameter and the one end. Further, the difference between the maximum outer diameter and the minimum outer diameter at the other end of the abutment surface defines the crowning between the maximum outer diameter and the other end.

Thus, according to this embodiment variant, the outer diameter is minimal at both axial ends, i.e. it decreases towards both axial ends. In this way, it is specifically not provided that the outer diameter extends continuously adjacent to the axial ends, in which case the axial ends would be formed cylindrically. According to an alternative embodiment, the outer diameter has a maximum outer diameter at the one axial end of the abutment surface, wherein the outer diameter continuously decreases towards the other axial end up to a minimum.

Accordingly, it can be provided that the difference between the maximum outer diameter and the outer diameter at a regarded axial position of the planet pin continuously increases towards both axial ends or towards one axial end of the planet pin. For the slide bearing gap, this means that it also increases towards the axial ends of the planet pin, as regarded in the assembled state without any loading and in the non-rotating state. Here, it is assumed that the contact surface of the planet gear forming the other surface of the slide bearing is cylindrically formed. During operation or under load, the planet gear nestles against the planet pin, so that an even gab is created across the axial length.

In a further embodiment of the invention, it is provided that the abutment surface of the planet pin forms a first convex curve in the longitudinal section, extending between the maximum of the outer diameter and the forward axial end of the abutment surface, and forms a second convex curve extending between the maximum of the outer diameter and the rearward axial end of the abutment surface. Here, the convex curve can in general be formed in any desired manner. In exemplary embodiments, it is provided that the first curve and/or the second curve is formed as a circular arc, that the first curve and/or the second curve is formed in a parabolic manner, or that the first curve and/or the second curve has curve portions that are formed in a rectilinear manner. In the latter case, the abutment surface of the planet pin may for example conically converge towards its axial ends. It can also be provided that the first curve and/or the second curve are comprised of multiple curve portions that are differently bent. Here, it can further be provided that one or multiple of these curve portions are formed in a rectilinear/linear manner.

In one embodiment, the maximum of the outer diameter of the planet pin is formed according to the regarded embodiment variant by a circumferential line (which extends in the circumferential direction of the planet pin). Thus, the maximum forms a point in the longitudinal section of the planet pin. This means that the mentioned first curve and the mentioned second curve steadily transition into each other, so that the abutment surface can be formed by a single bent curve (which can be comprised of differently bent curve portions in the embodiment variants). Accordingly, it can be provided in embodiments of the invention that the abutment surface of the planet pin is formed to be completely circular or parabolic with a maximum of the outer diameter in the axial center of the planet pin or alternatively outside the axial center of the planet pin.

In one alternative embodiment of the invention, it is provided that the maximum of the outer diameter of the planet pin is formed by a cylindrical area with a constant outer diameter that extends over a defined axial length. According to one embodiment variant, the axial length is dimensioned in such a manner that the ratio of the axial length of the cylindrical area to the axial total length of the abutment surface is between 0 and 0.75.

Here, such a cylindrical plateau area can be formed centrally or off-center. Connecting to it may for example be surfaces that are circular, parabolic or rectilinear in the longitudinal section.

In one embodiment of the invention it is provided that the ratio of half the difference between the maximum outer diameter and the minimum outer diameter of the planet pin to the maximum outer diameter is between 0.00005 and 0.005. Here, the indicated half the difference specifically refers to the crowning of the planet pin. If the planet pin has different minimal outer diameters at the two axial ends of the abutment surface, the mentioned ratio respectively applies with respect to the maximum outer diameter and the minimum outer diameter at the respectively regarded axial end.

In further variants of the invention, it is provided that the planet pin has a maximum of its outer diameter in its axial center (i.e. centrally between the axially forward end and the axially rearward end of the abutment surface). The planet pin is formed to be mirror-symmetrical with respect to its axial center. However, this is not necessarily the case. In alternative variants of the invention, it is provided that the planet pin has a maximum of its outer diameter outside its axial center, and correspondingly is formed to be asymmetrical with respect to its axial center.

According to one embodiment of the invention, the planet pin is formed as a rotational body, i.e. it is rotationally symmetrical with respect to the longitudinal axis of the pin. However, this is not necessarily the case. According to alternative embodiments, the planet pin has an abutment surface with a crowned design only across a circumferential angle that is less than 360°, in particular in the range of ±60° about the nominally loaded area. Thus, the crowned profile of the planet pin according to the invention does not extend over the entire circumference of the planet pin, but only over a defined angular range in the circumferential direction. The described positive effect on the slide bearing is achieved also in such an embodiment. In addition, the oil consumption for lubrication is reduced, since an increased lubricating film thickness at the axial ends is not provided over the entire circumference.

In one embodiment variant of an abutment surface with a crowned design extending across a circumferential angle of less than 360°, it is provided that the circumferential angle across which the abutment surface with the crowned design extends varies in the axial direction of the planet pin. In this manner, an increased lubricating film thickness can be adjusted in a precise manner depending on the axial position.

Here, it is provided in one embodiment that the abutment surface with the crowned design extends at the maximum outer diameter across a minimum circumferential angle, and the circumferential angle across which the abutment surface with the crowned design extends continuously increases from the maximum outer diameter towards the axial ends of the abutment surface to an maximum circumferential angle, so that the abutment surface with the crowned design extends at the axial ends of the abutment surface across a larger circumferential angle than in the area of the maximum outer diameter. Here, it can be provided that the maximum outer diameter is realized in a cylindrical area. Further, it can be provided that the radial height of the crowing decreases in the circumferential direction towards the boundary lines of the abutment surface with the crowned design.

If the planet pin is formed in a rotationally symmetrical manner, the outer diameter at a regarded axial position is the same for all points of a circumferential line. If the planet pin is not formed in a rotationally symmetrical manner, the largest outer diameter is considered the outer diameter of a regarded axial position within the meaning of the present invention.

According to one embodiment of the invention, the planet pin has an axially forward end and an axially rearward end, which are arranged at an axial distance to the axially forward end and the axially rearward end of the abutment surface, wherein, at its forward axial end, the planet pin is connected to a forward support plate and, at its rearward axial end, is connected to a rearward support plate. Thus, the planet pin extends at both ends to beyond the abutment surface, and there is respectively connected to a support plate. Thus, it has to be differentiated between the axial ends of the abutment surface and the axial ends of the planet pin.

In another embodiment of the invention it is provided that the planet pins have an axial opening on the inside and are formed for the purpose of receiving a support pin of a torque carrier therein.

According to one embodiment of the invention, the planet pins are coupled with a torque carrier, wherein, when the sun gear rotates and the ring gear is fixedly arranged, the torque carrier rotates with a reduced speed about the rotation axis of the planetary gearing. Here, the torque carrier may for example be coupled to a fan shaft. The planet gears thus rotate about their own axis as well as about the rotation axis of the planetary gearing, and do so with respectively different rotational speeds.

Here, it is provided in one embodiment of the invention that the planet pins are hollow inside and configured for the purpose of receiving a support pin of a torque carrier, with a torque transmission occurring via the support pin.

Alternatively, it can be provided that the planet pins are fixedly connected to a forward support plate and with a rearward support plate, wherein the forward support plate is coupled to the torque carrier for torque transmission. Here, the planet pins can for example be screwed or welded together with the support plates.

In another embodiment of the invention, it is provided that the planet pins, including the abutment surface with the crowned design, are formed in one piece. Thus, they represent single-part components.

The planet pin of the present invention has an outer-side abutment surface with a crowned design. Here, the planet pin, which is usually hollow, i.e. provided with an axial opening or bore, can generally have any desired design at its interior surface. For example, the planet pin can be formed to be hollow-cylindrical on the inside, that is, to have an axial opening with a constant diameter. In other embodiment variants, it can be provided that the inner diameter of the planet pin varies along its axial extension.

In a further aspect, a pin for a planetary gearing has an outer-side abutment surface for a slide bearing with an axially forward end and an axially rearward end, wherein the planet pin forms a crowning at its abutment surface in the sense that its outer diameter decreases from a maximum outer diameter towards at least one axial end of the abutment surface, and has a minimum at the axial end. The advantageous embodiments as disclosed herein which are explained with respect to the planetary gearing also apply to the pin. In general, the pin can be used in any kind of gearing with a slide bearing.

In a further aspect, a gear fan engine comprises a fan stage, a fan shaft via which the fan stage is driven, and a turbine shaft.

The turbine shaft may for example be a shaft that is coupled to a low-pressure turbine or a medium-pressure turbine of the engine. It is provided that the turbine shaft and the fan shaft are coupled via a planetary gearing as disclosed herein, wherein the turbine shaft forms the sun shaft, the planet pins are coupled to a torque carrier, and the torque carrier is coupled to the fan shaft.

It is to be understood that the present invention is described with respect to a cylindrical coordinate system, having the coordinates x, r and φ. Here, x indicates the axial direction, r indicates the radial direction, and φ indicates the angle in the circumferential direction. Here, the axial direction is defined by the rotation axis of the planetary gearing, which is identical with the machine axis of a gear fan engine inside of which the planetary gearing is arranged. Beginning at the x-axis, the radial direction points radially outward. Terms such as "in front", "behind", "frontal" and "rear" refer to the axial direction or the flow direction inside the engine inside of which the planetary gearing is arranged. Terms such as "outer" or "inner" refer to the radial direction.

In the following, the invention is explained in more detail based on multiple exemplary embodiments by referring to the Figures of the drawing. Herein:

Figure 1:
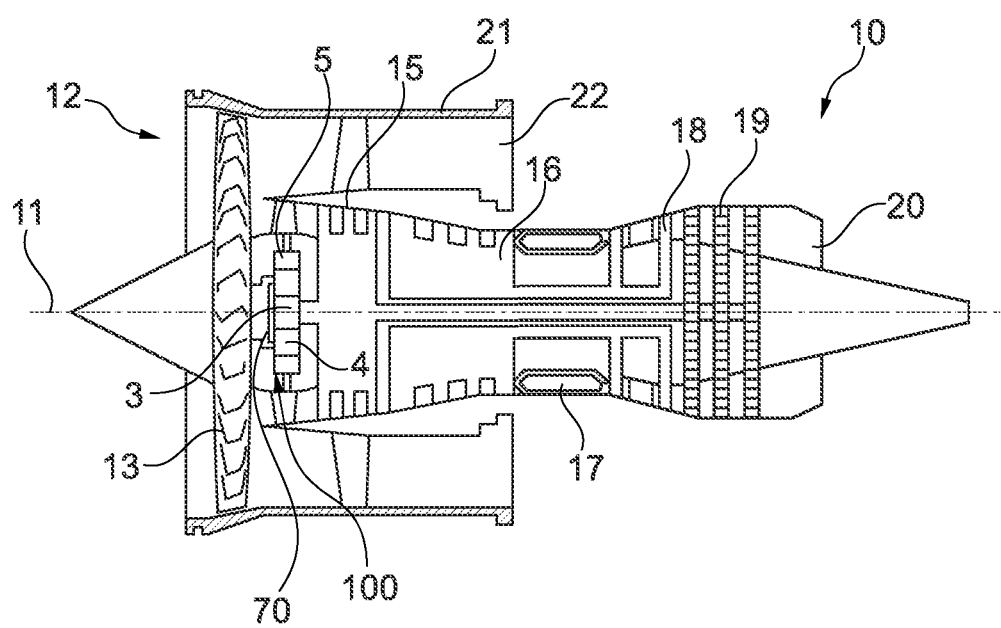
FIG. 1 shows a simplified schematic sectional rendering of a gear fan engine.

FIG. 1 shows a gear fan engine 10 with a rotation axis 11 that is provided for being used in airplanes. In the direction of the axial through flow, the gear fan engine 10 successively comprises an air intake 12, a fan stage 13 (in general also more than one fan stage 13 is possible), a gear 100, a medium-pressure compressor 15, a high-pressure compressor 16, a combustion device 17, a high-pressure turbine 18, a medium-pressure turbine 19, and a nozzle 20. A fan housing 21 surrounds the fan stage 13 and defines the air intake 12.

In general, the gear fan engine 10 operates in a conventional manner, wherein air entering the intake 12 is accelerated by the fan stage 13. Here, two air flows are created. A first flow flows into the medium-pressure compressor 15, a second air flow flows through a bypass channel 22, wherein the second air flow provides the greatest portion of the thrust of the gear fan engine 10. The medium-pressure compressor 15 compresses the entering air flow before it reaches the high-pressure compressor 16 inside of which further compression occurs. The compressed air that is discharged from the high-pressure compressor 16 is introduced into the combustion device 17 where it is intermixed with fuel, and the mixture is then combusted. The hot combustion gases are decompressed in the high-pressure turbine 18 and in the medium-pressure turbine 19 before being discharged through the nozzle 20, and thus providing additional thrust.

Thus, the gear fan engine 10 forms a bypass channel 22 and a primary flow channel behind the fan stage 13. The primary flow channel leads through the core engine (gas turbine) that comprises the medium-pressure compressor 15, the high-pressure compressor 16, the combustion device 17, the high-pressure turbine 18, and the medium-pressure turbine 19. The bypass channel 22 guides air which is sucked in by the fan stage 13 during operation of the gear fan engine 10 past the core engine.

Via shaft devices, the high-pressure turbine 18 and the medium-pressure turbine 19 respectively drive the high-pressure compressor 16 and the medium-pressure compressor 15. A medium-pressure shaft drives the fan stage 13 via the gear 100. Here, the gear 100 is embodied as a reduction gear which reduces the rotational speed of the fan stage 13 as compared to the medium-pressure compressor 15 and to the medium-pressure turbine 19. In the shown embodiment, the gear 100 is a planetary gearing with a static ring gear 5 and circumferential planet gears 4 rotating in the ring gear 5. The gears 100 are driven via a sun gear 3 that is coupled to the medium-pressure shaft. In the shown embodiment, the drive is provided via a torque carrier 70 that is coupled to the planet gears 4.

In general, also other embodiments of the gear 100 are possible, wherein e.g. the ring gear 5 can be formed in a movable manner, so that the drive is provided via the ring gear 5.

The embodiment of the gear fan engine 10 according to FIG. 1 is to be understood merely as an example. In particular, the arrangement of the shafts can also be chosen to be different, wherein in general arrangements with two or three shafts are possible. For example, a three-shaft arrangement can alternatively be provided that comprises a low-pressure shaft connecting the low-pressure turbine to the fan, a medium-pressure shaft connecting the medium-pressure turbine to the medium-pressure compressor, and a high-pressure shaft connecting the high-pressure turbine to the high-pressure compressor. Here, the fan stage 13 is connected via a gear to the low-pressure shaft. Further, if the turbofan engine does not have a medium-pressure compressor and a medium-pressure turbine, only a low-pressure shaft and a high-pressure shaft can be present, with the fan stage 13 again being connected via a gear to the low-pressure shaft.

With the rotation axis 11, the described components have a common rotational or machine axis. The rotation axis 11 defines an axial direction of the engine 10. A radial direction of the engine 10 extends perpendicular to the axial direction.

What is relevant in the context of the present invention is the embodiment of the planetary gearing 100.

Figure 2:
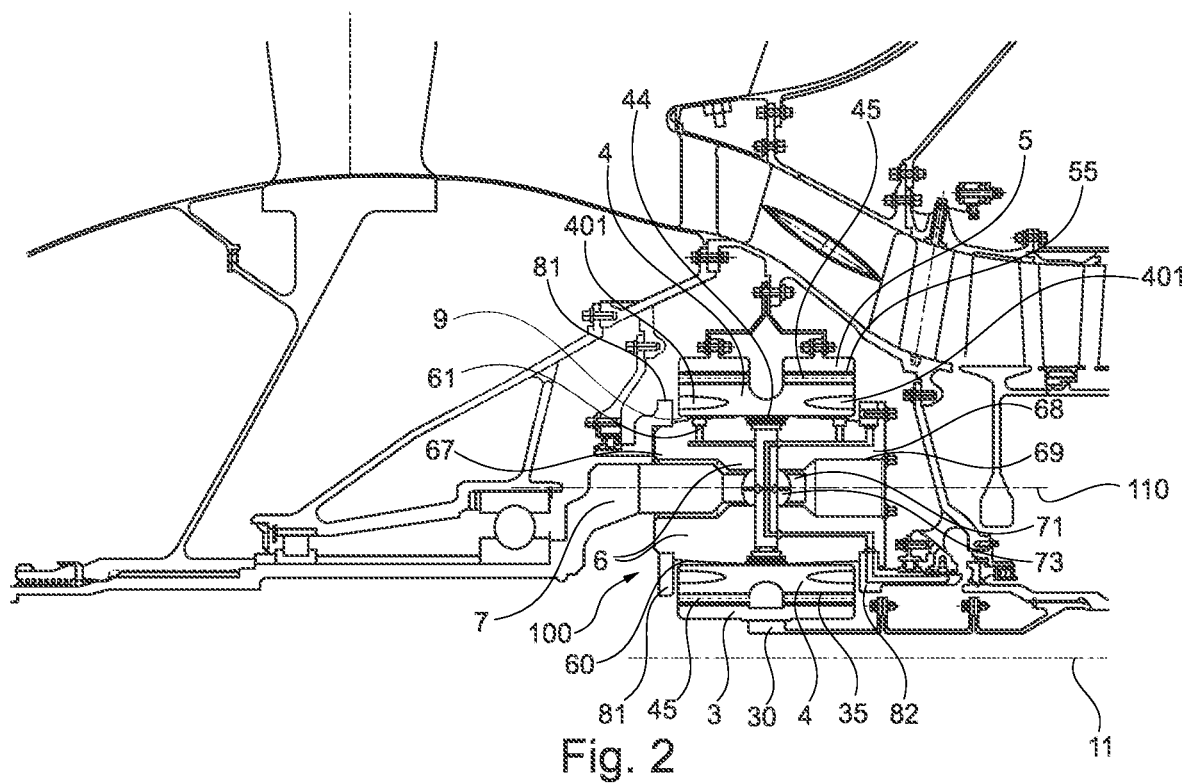
FIG. 2 shows a sectional rendering of elements of a planetary gearing that is suitable for being used in a gear fan engine, wherein a sun shaft, a sun gear, a planet gear, a planet pin and a support pin of a torque carrier are shown, and wherein the planet pin forms a crowing at its abutment surface.

FIG. 2 shows an exemplary embodiment of a planetary gearing 100 in a sectional rendering. The planetary gearing 100 comprises a sun gear 3 that is driven by a sun shaft 30. The sun shaft 30 may for example be the medium-pressure shaft of FIG. 1. Here, the sun gear 3 and the sun shaft 30 rotate about a rotation axis 11 that defines an axial direction of the planetary gearing 100.

The planetary gearing 100 further comprises a plurality of planet gears 4 of which one is shown in the sectional rendering of FIG. 2. The sun gear 3 drives the plurality of planet gears 4, wherein a toothing 35 of the sun gear 3 is in engagement with the toothing 45 of the planet gear 4. The toothing 35, 45 may for example be a double helical gearing.

The following description of a planet gear 4 applies to all planet gears that are driven by a sun gear 3. The planet gear 4 is configured as a hollow cylinder and forms an outer shell surface and an inner shell surface 44. Driven by the sun gear 3, the planet gear 4 rotates about a rotation axis 110 that extends in parallel to the rotation axis 11. The outer shell surface of the planet gear 4 forms a toothing 45 that is in engagement with the toothing 55 of a ring gear 5. The toothings 45, 55 can also be formed as double helical gearing. The ring gear 5 is arranged in a stationary, i.e. non-rotating, manner. The planet gears 4 rotate as a result of being coupling with the sun gear 3, and in doing so travel along the circumference of the ring gear 5. The rotation of the planet gears 4 along the circumference of the ring gear 5 and thus about the rotation axis 110 is slower than the rotation of the sun shaft 3, whereby a gear reduction is provided.

Adjacent to its inner shell surface 44, the planet gear 4 has a centered axial opening. Inserted into the opening is a planet pin 6, wherein the planet pin 6 and the planet gear 4 form a lubricated journal bearing at their facing surfaces. For lubricating the slide bearings, radially extending lubricating film openings 61 can be formed in the planet pin 6, through which lubricating oil that is sprayed in from the inside or supplied in another manner can be supplied into a slide bearing gap 9 between the planet pin 6 and the planet gear 4. Here, it is to be understood that also additional or other kinds of means for supplying lubricating oil to the slide bearing can be provided in the planet pin 6.

During operation, the planet gear 4 and the planet pin 6 do not have the exact same axis, since the slide bearing with its hydrodynamic design entails an eccentricity in the range of tenths of a millimeter.

The planet pin 6 has an outer-side abutment surface 60 that is formed in a crowned manner. Accordingly, the outer diameter of the planet pin decreases towards the axial ends of the abutment surface 60 and has a minimum there.

Adjacent to its inner surface 69, the planet pin 6 also has an axial opening or bore and is provided for the purpose of receiving a support pin 7 of a torque carrier therein. At that, the support pin 7 is mounted in a tapering area 71 of the support pin 7 in a joint bearing 73 inside the bore of the planet pin 6. The joint bearing 73 allows for a certain degree of tilting of the support pin 7 with respect to the rotation axis 110. A support pin 7 is arranged in each of the planet pins 6 of the planetary gearing 100. At their ends that project from the opening of the planet pin 6, the support pins 7 are fixedly connected to each other and at that form a torque carrier corresponding to the torque carrier 70 of FIG. 1. The torque carrier forms a drive element of the planetary gearing and is coupled to the fan shaft or in general to the output shaft.

Here, the exact shape of the support pin 7 and its shown mounting at the inner surface of the planet pin 6 are to be understood merely as an example. It is also to be understood that a coupling of the planet pin 6 to the torque carrier can also be realized in a different manner, as shown based on FIGS. 4 and 5 by way of example.

FIG. 2 further shows a forward support plate 81 and a rearward support plate 82. The planet pin 6 is affixed at the forward support plate 81 and at the rearward support plate 82, for example it may be screwed or welded together with them. For this purpose, it is provided that the planet pin 6 has an axially forward end 67 and an axially rearward end 68 which respectively axially protrude with respect to the ends of the abutment surface 60, wherein the planet pin 6 is attached at the support plates 81, 82 at the ends 67, 68.

The structure of the planet gear 4 and of the planet pin 6 will be explained in more detail in the following with respect to FIG. 3, which represents a section of FIG. 2.

Figure 3:
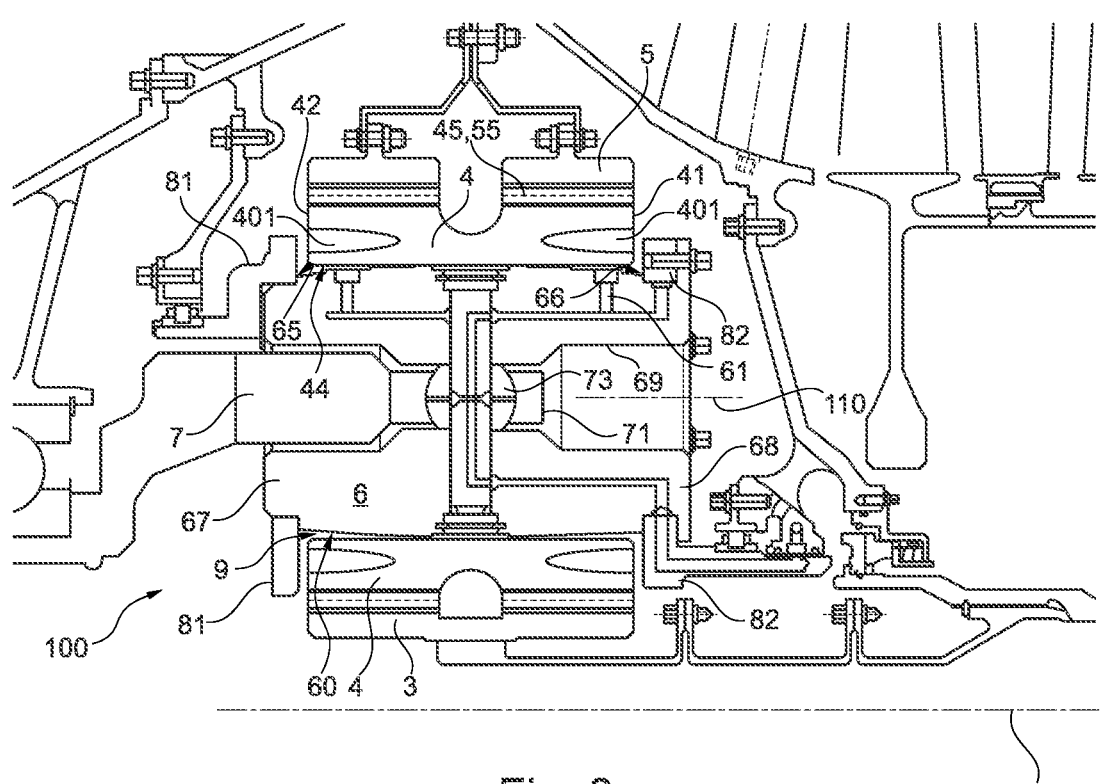
FIG. 3 shows an enlarged rendering of the planet gear and of the planet pin of FIG. 2.

As can be seen in FIG. 3, at its two face sides 41, 42, the planet gear 4 forms respectively one recess 401 that extends from the face side 41, 42 substantially in the axial direction (or starting from the face side 41 counter to the axial direction) into the interior space of the planet gear 4. In this way, the mass of the planet gear 4 and the stiffness of the planet gear 4 are reduced towards its face sides 41, 42.

The slide bearing between the planet pin 6 and the planet gear 4 is formed by the cylindrical inner shell surface 44 of the planet gear 4 and the abutment surface 60 of the planet pin 6 that is provided with a crowning. Here, due to the curvature of the abutment surface 60, the slide bearing gap 9 formed in the area of the slide bearing increases in radial thickness towards the axially forward end and towards the axially rearward end of the slide bearing. However, in the event that strong torques and centrifugal forces occur, the adjacent surfaces 44, 60 of the slide bearing can align to be substantially in parallel at its ends. This is also supported by the recesses 401 that are formed in the planet gear 4, which provide the latter with an increased flexibility at its ends.

The abutment surface 60 has an axially forward end 65 and an axially rearward end 66.

Figure 4:
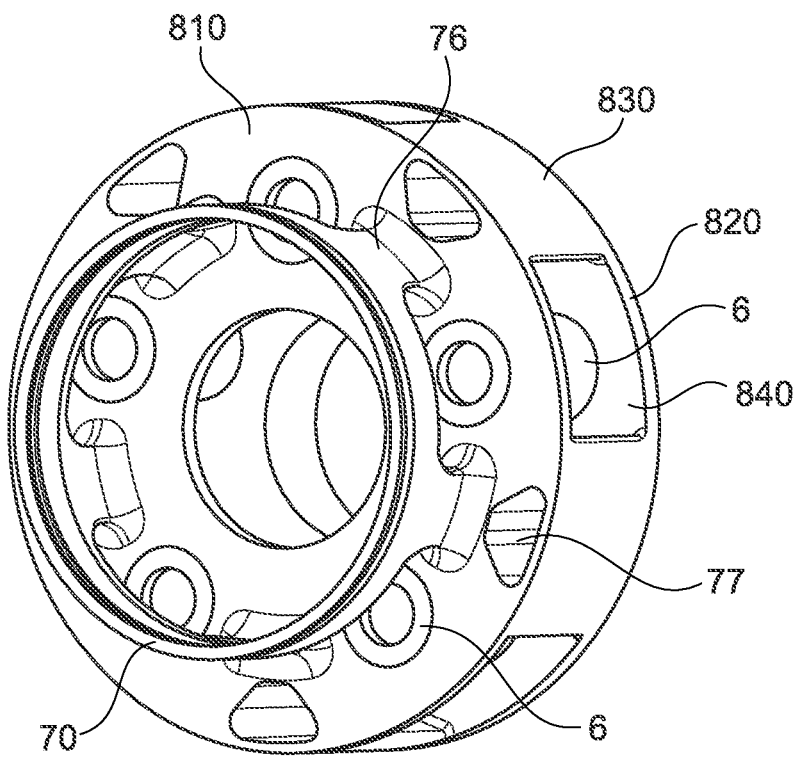
FIG. 4 shows a rendering of elements of an alternative planetary gearing in which, in contrast to the planetary gearing of FIGS. 2 and 3, no support pin is provided, and a torque transmission to a torque carrier instead occurs via a support plate that is fixedly connected to the planet pins.
Figure 5:
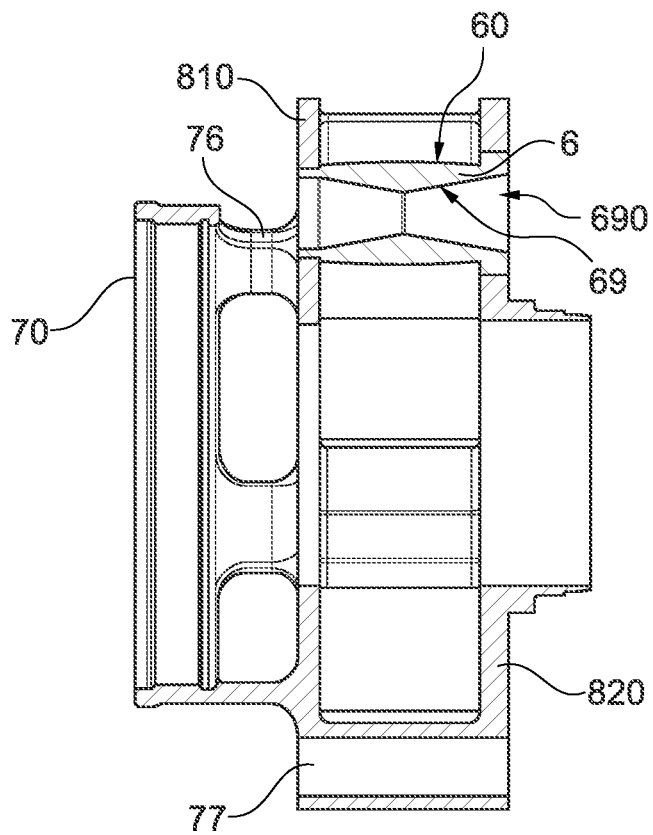
FIG. 5 shows elements of the planetary gearing of FIG. 4 in a partially sectioned view.

FIGS. 4 and 5 show elements of a further planetary gearing. In general, the planetary gearing of FIGS. 4 and 5 has the same structure as the planetary gearing of FIGS. 2 and 3. It only differs in the manner in which the torque is received and transmitted to a torque carrier (corresponding to the torque carrier 70 of FIG. 1). FIG. 4 only shows such elements of the planetary gearing that relate to this different manner of torque transmission. The other elements that are not shown correspond to the embodiment of FIGS. 2 and 3. In particular, the gear comprises a sun gear, a sun shaft, a plurality of planet gears driven by the sun gear, and a ring gear, as has been explained with respect to FIGS. 2 and 3 *t*.

As can be seen in FIGS. 4 and 5, the planet pins 6 are fixedly connected to a forward support plate 810 and a rearward support plate 820. For example, they may be fixedly screwed or welded together with the support plates 810, 820. Just like in the exemplary embodiment of FIGS. 2 and 3, the planet pin 6 respectively has one crowned outer-side abutment surface 60. At its inner surface 69, the planet pin 6 forms a bore 690, with its inner diameter decreasing towards the axial center of the planet pin. In the shown exemplary embodiment, the bore 690 is formed as a double cone. This will be explained in more detail with respect to FIGS. 17 and 18.

In contrast to the exemplary embodiment of FIGS. 2 and 3, the axial bore 690 of the planet pin 6 does not receive a support pin of a torque carrier, but is empty. There is no support pin. The transmission of a torque onto a torque carrier 70 is realized via connecting webs 76 that fixedly connect the torque carrier 70 to the forward support plate 810. In the shown exemplary embodiment, the torque carrier 70 is formed as a ring. However, this is to be understood merely as an example. The torque carrier 70 is coupled to the fan shaft in a manner that is not shown.

In the exemplary embodiment of FIGS. 4 and 5, the torque carrier 70, the forward support plate 810 and the rearward support plate 820 are formed in one piece, while in the exemplary embodiment of FIGS. 2 and 3 they are formed in three pieces. By combining the torque carrier and the support plates into one part, the support pin 7 of FIGS. 2 and 3 can be omitted. The reception of the torque does no longer occur centrally in the bore of the planet pin 6, but by the forward support plate 810. Accordingly, in the exemplary embodiment of FIGS. 4 and 5, there is also no joint bearing (corresponding to the joint bearing 73 of FIGS. 2 and 3) needed.

As for the one-piece structure of the forward support plate 810, the rearward support plate 820 and the torque carrier 70, it is further remarked that the forward support plate 810 and the rearward support plate 820 are connected to each other by wall surfaces 830 formed at the circumference, with respectively substantially rectangular recesses 840 being located in between them which serve for receiving respectively one planet gear. Further, the structural unit formed by the two support plates 810, 820 and the torque carrier 70 has axial bores 77 that may serve for coupling further parts (not shown) for torque transmission.

The shown number of five planet pins 6, five connecting webs 76 and five axial bores 77 is to be understood merely as an example.

Figure 6:
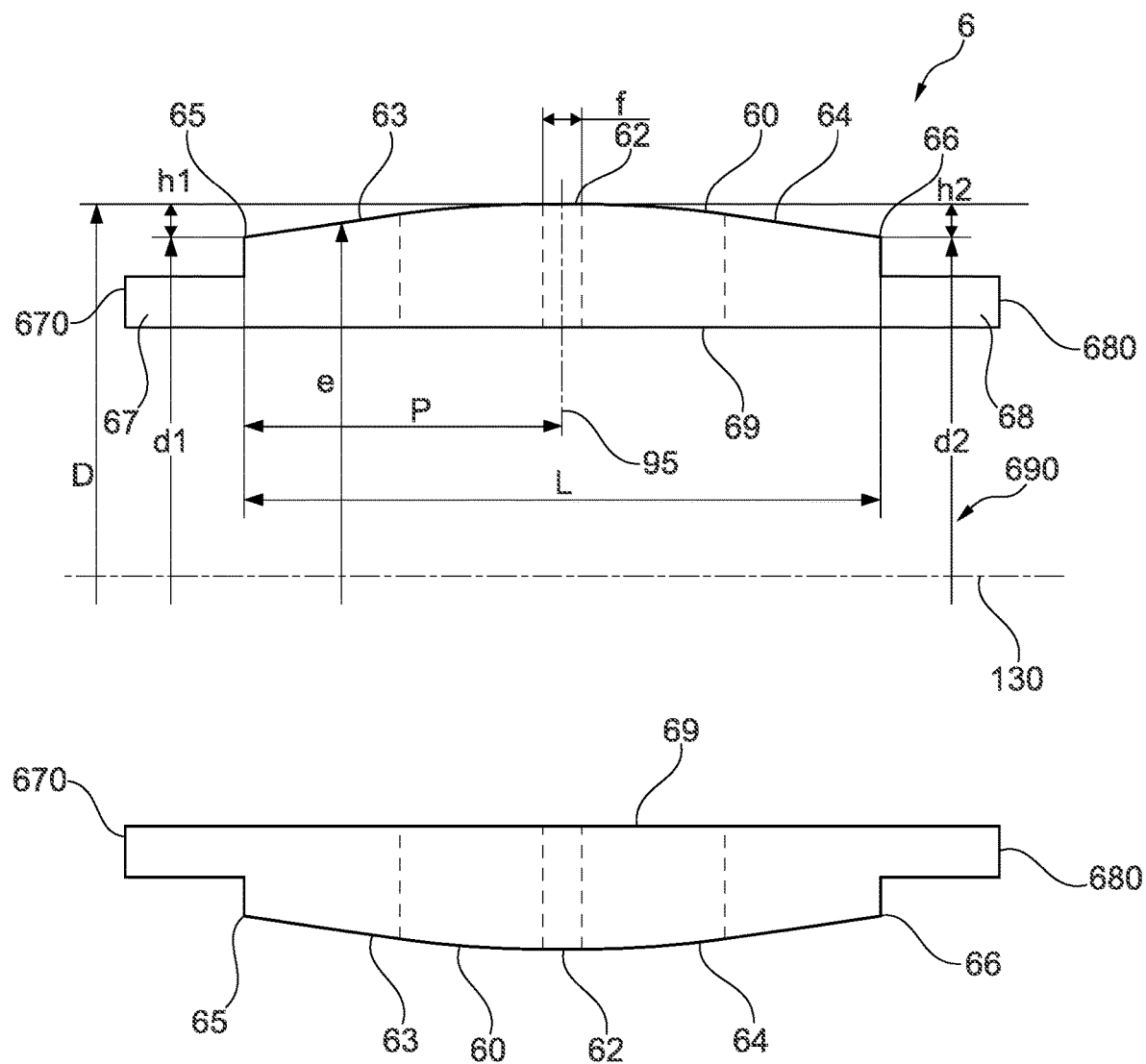
FIG. 6 shows a sectional rendering of the planet pin corresponding to FIGS. 2 and 3.

In FIG. 6, the embodiment and the relevant parameters of a planet pin, which is formed corresponding to a planet pin 6 according to FIGS. 2 to 5, are explained by way of example. Here, a longitudinal axis 130 of the planet pin 6 can be seen in the sectional rendering of FIG. 6. It is substantially identical with the rotation axis 110 of the planet gear 110, cf. FIG. 2. However, the hydrodynamic design of the slide bearing entails a minor eccentricity, e.g. in the range of tenths of a millimeter. Adjacent to an inner shell surface or inner surface 69 of the planet pin 6, the planet pin 6 forms an axial opening 690 that serves for receiving a support pin of a torque carrier, for example the support pin 7 of FIG. 2.

The planet pin 6 forms an outer-side abutment surface 60 comprising an axially forward end 65 and an axially rearward end 66. The axial distance between these two ends is indicated by L. Between these two ends 65, 66, the abutment surface 60 forms a crowning in the sense that its outer diameter decreases towards the axial ends 65, 66 and reaches a minimum at the axial ends 65, 66.

Here, the planet pin 6 has a minimum outer diameter d1 at its axial end 65, a minimum outer diameter d2 at its axial end 66, and a maximum outer diameter D between its axial ends 65, 66. Here, half the difference h1 between the maximum outer diameter D and the minimum outer diameter d1 defines the crowning of the abutment surface between the axial position of the maximum outer diameter and the one end 65. Further, half the difference h2 between the maximum outer diameter D and the minimum outer diameter d2 defines the crowning of the abutment surface between the axial position of the maximum outer diameter and the other end 66.

It can be provided that d1 equals d2, or alternatively that d1 does not equal d2. Accordingly, h1 equals h2, or h1 does not equal h2.

The difference between the maximum outer diameter D and the outer diameter e at a regarded axial position of the planet pin constantly increases towards the axial ends 65, 66 of the planet pin 6.

In the exemplary embodiment of FIG. 6, the maximum outer diameter D is realized at the axial center 95 of the planet pin 6 and in a cylindrical area 62 of the axial length f about this axial center 95. The maximum of the outer diameter D is thus realized in a cylindrical area 62 with a constant outer diameter that extends symmetrically to the axial center 95 over a defined axial length f. However, this is not necessarily the case. Alternatively, the maximum of the outer diameter D is only reached at an apex along a circumferential line or in the longitudinal section shown in FIG. 6.

The axial distance between the axially forward end 65 of the abutment surface 60 and the maximum of the outer diameter D or, if the maximum is formed in a cylindrical area, to the center of this cylindrical area, is indicated by P in FIG. 6. In FIG. 6, P is located in the axial center 95 of the abutment surface due to the symmetrical embodiment of the abutment surface 60.

In the longitudinal section, the abutment surface 60 of the planet pin 6 forms a first convex curve 63 that extends between the cylindrical area 62 and the forward axial end 65, and forms a second convex curve 64 that extends between the cylindrical area 62 and the rearward axial end 66. In general, the curves 63, 64 can have any desired shape. For example, the curves can be formed in a circular, parabolic or rectilinear manner.

The planet pin 6 has axial elongations or ends 67, 68, which respectively form one forward axial face side 670 of the planet pin 6 and one rearward axial face side 680 of the planet pin. As has been explained with respect to FIGS. 2 to 5, the planet pin 6 is affixed at these ends 67, 68 respectively at a support plate.

In embodiments of the invention, the planet pin 6 realizes certain ratios of the parameters h, P, L and D, as they are defined above.

Thus, the following applies to the ratio of the length P to the axial total length L: $0 \leq P/L \leq 1$. This means that the maximum of the outer diameter D can in general be formed at any axial position of the planet pin 6. In particular, also asymmetrical arrangements are possible. The invention also comprises embodiment variants in which the maximum of the outer diameter D is formed at the one axial end 65 of the abutment surface (P=0) or at the other axial end 66 of the abutment surface (P=L). In other embodiment variants, the maximum of the outer diameter D is always located between the two axial ends 65, 66 of the abutment surface.

The following applies to the ratio of the axial length of the cylindrical area f to the axial total length L: $0 \leq f/L \leq 0.75$. The larger this ratio, the greater the axial extension of the cylindrical area. If the ratio f/L equals zero, f equals zero, i.e. in that case a cylindrical area with a constant outer diameter is not present.

The following applies to the ratio of half the difference h1, h2 between the maximum outer diameter D and the minimum outer diameter d1, d2 to the maximum outer diameter D: $0.00005 \leq h1/D \leq 0.005$ as well as $0.00005 \leq h2/D \leq 0.005$. These ratios determine the crowning of the abutment surface 60. Here, h1 may equal h2.

The planet pin 6 shown in FIG. 6 is formed in a rotationally symmetrical manner.

FIGS. 7-10 respectively show, in a sectional view, different embodiments of a planet pin 6 corresponding to the planet pin of FIG. 6, wherein it can be seen that, adjacent to the interior surface 69, the planet pin 6 forms an opening 690 that may for example serve for receiving a planet pin in a manner corresponding to the description of FIGS. 2 and 3.

Here, the parameters f, h, P and L that have been explained with reference to FIG. 6 are chosen differently in FIGS. 7-10, as will be described in the following.

Figure 7:
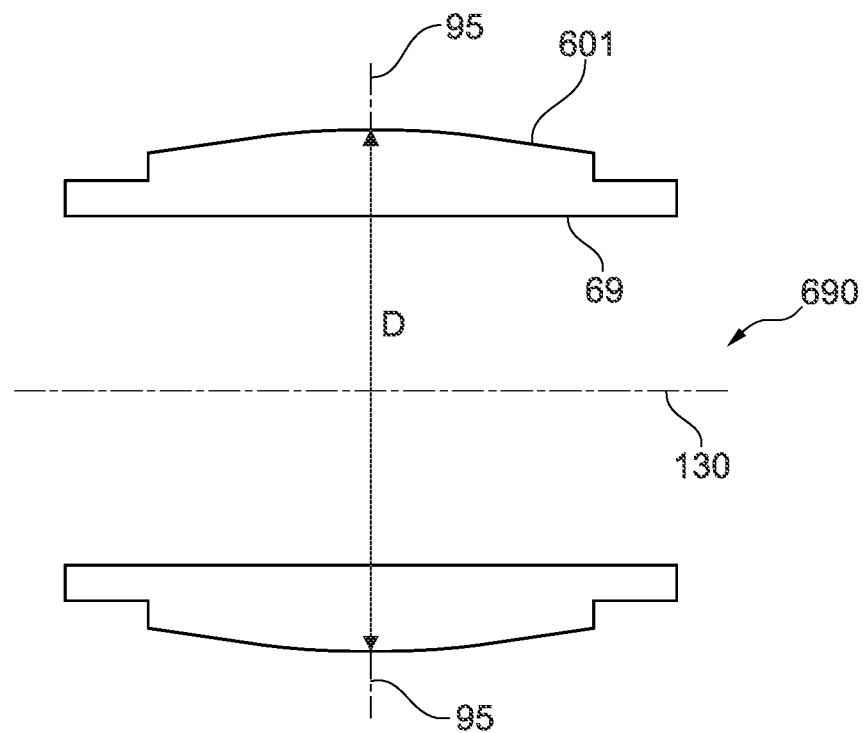
FIG. 7 shows a sectional view of a further exemplary embodiment of a planet pin provided with a crowning, wherein the planet pin forms a circular-arc-shaped abutment surface.

In the exemplary embodiment of FIG. 7, the abutment surface 601 is formed without a cylindrical area, i.e. the parameter f equals zero. Correspondingly, the maximum outer diameter D is realized in the axial center 95 of the planet pin 6. The two convex curves 63, 64 of FIG. 6 form a common curve, which may for example be formed by a circular arc.

Here, the planet pin of FIG. 7 is formed to be mirror-symmetrical with respect to its axial center 95.

Figure 8:
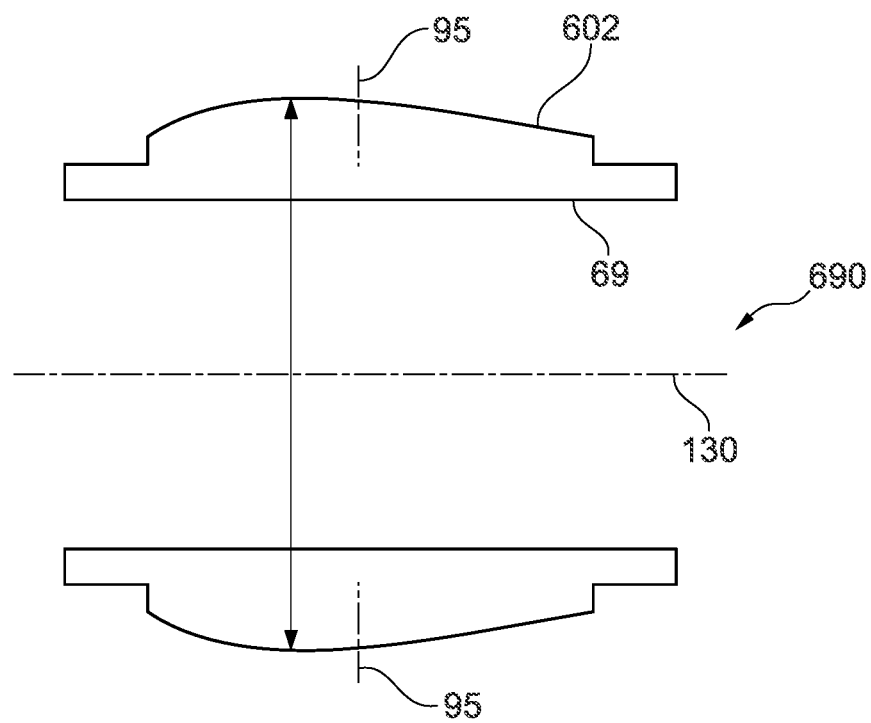
FIG. 8 shows a sectional view of a further exemplary embodiment of a planet pin provided with a crowning, wherein the planet pin forms an asymmetrically formed abutment surface.

In the exemplary embodiment of FIG. 8, the maximum of the outer diameter D is realized outside of the axial center 95, so that an asymmetry is realized in the design of the abutment surface 602. Again, no cylindrical area is provided. In the regarded sectional view, the two convex curves 63, 64 of FIG. 6 form a common curve 602. It may for example be formed by a parabolic arc.

Figure 9:
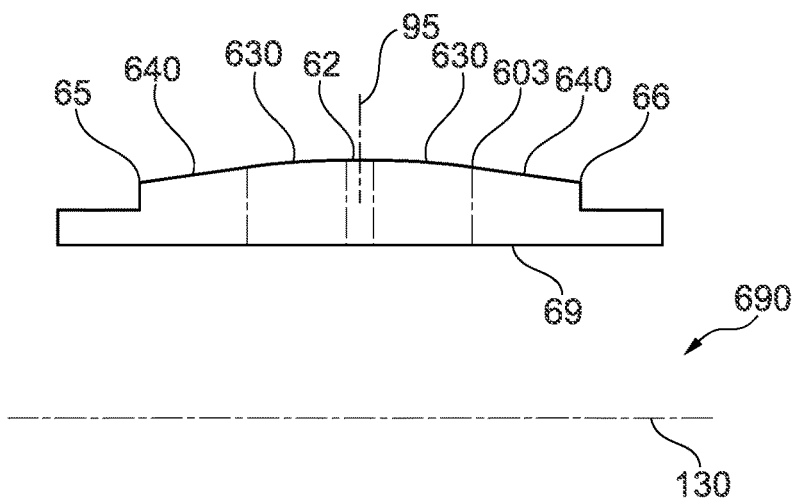
FIG. 9 shows a sectional view of a further exemplary embodiment of a planet pin provided with a crowning, wherein the planet pin is formed in a symmetrical manner, and the abutment surface has differently formed areas.
Figure 9:

In FIG. 9, an exemplary embodiment is regarded in which the abutment surface 603 forms a cylindrical area 62 in which the outer diameter D is maximal. This area 62 is formed in the center, so that the planet pin 6 is mirror-symmetrical with respect to its axial center 95.

Adjacent to the cylindrical area 62 on both sides, the abutment surface 603 forms areas that are curved in a circular manner, with conically shaped areas that extend up to the axial ends 65, 66 of the abutment surface 603 connecting to these areas. In the sectional view of FIG. 9, the abutment surface forms a circular arc 630 in the circularly curved area and a straight line 640 in the conically shaped area, with the latter extending up to the axial ends 65, 66 of the abutment surface 603.

Figure 10:
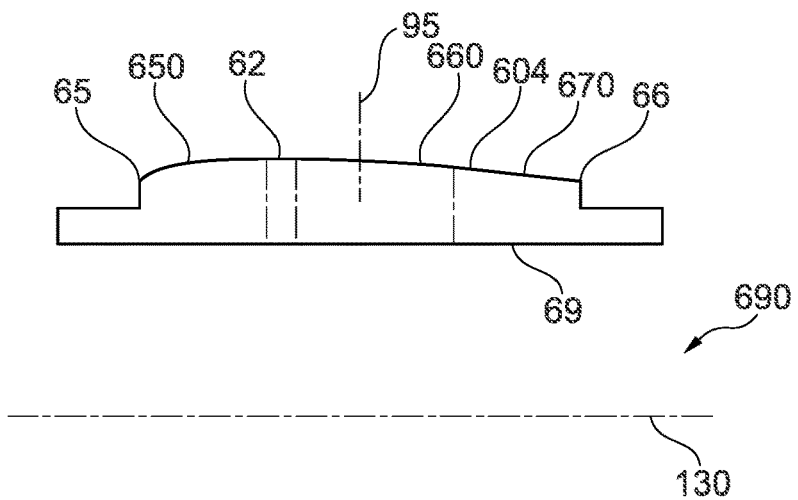
FIG. 10 shows a sectional view of a further exemplary embodiment of a planet pin provided with a crowning, wherein the planet pin is formed in an asymmetrical manner, and the abutment surface has differently formed areas.
Figure 10:
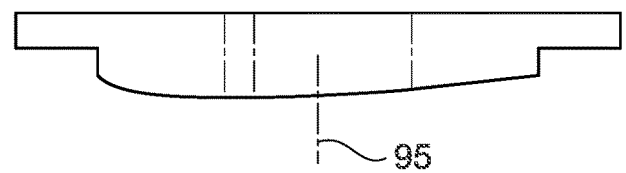

FIG. 10 shows an exemplary embodiment in which the maximum of the outer diameter D is realized outside of the axial center 95, so that an asymmetry is realized in the design of the abutment surface 604. Here, the abutment surface 604 forms a cylindrical area 62 in which the outer diameter D is maximal. However, this area 62 is formed in a manner offset to the axial center 95 of the planet pin 6. From the cylindrical area 62, a parabolically curved area extends up to the axially forward end 65 of the abutment surface 604, which forms a parabolic line 650 in FIG. 10. Two differently configured areas are formed between the cylindrical area 62 and the axially rearward end 66 of the abutment surface 604, at first a circularly curved area and, connecting thereto and extending up to the axial end 66, a conically tapering area, which form a circular arc 660 and a straight line 670 in the sectional view of FIG. 10.

FIGS. 15 to 20 show a further exemplary embodiment of a planet pin 6, wherein this exemplary embodiment is characterized in that the abutment surface with the crowned design does not extend across a circumferential angle of 360°, but across a circumferential angle of less than 360°.

First referring to FIGS. 15 to 18, the planet pin 6 forma an outer-side abutment surface 60 that has an axially forward end 65 and an axially rearward end 66. The axial distance between these two ends is indicted by L, cf. FIG. 17. Between the two ends 65, 66, the abutment surface 60 forms a crowning in the sense that its outer diameter decreases towards the axial ends 65, 66, and reaches a minimum at the axial ends 65, 66.

Here, the abutment surface 60 with the crowned design extends in the circumferential direction across a range that is smaller than 360°. This crowned area is delimited by two boundary lines 610, 620. Here, the angle across which the abutment surface 60 extends in the circumferential varies depending on the axial position, as will be explained in the following, so that the boundary lines 610, 620 do not extend in a rectilinear manner, but are bent. The planet pin 6 forms a cylindrically shaped area 600 outside of the circumferential area in which the planet pin 6 forms a crowning. The crowning of the planet pin 6 in the area of the abutment surface 60 is realized by a material removal in the area of the abutment surface 60 which increases towards the axial ends 65, 66.

In the circumferential area in which the planet pin 6 forms a crowning, it has a minimum outer diameter d at its axial ends 65, 66, and a maximum outer diameter D between its axial ends 65, 66. Here, the difference between D/2 and d/2 defines the maximum height h of the crowning of the abutment surface between the axial position of the maximum outer diameter and the two ends 65, 66. Alternatively, the minimum outer diameter can be different at the two ends 65, 66. With respect to this, FIG. 6 is referred to.

Figure 17:
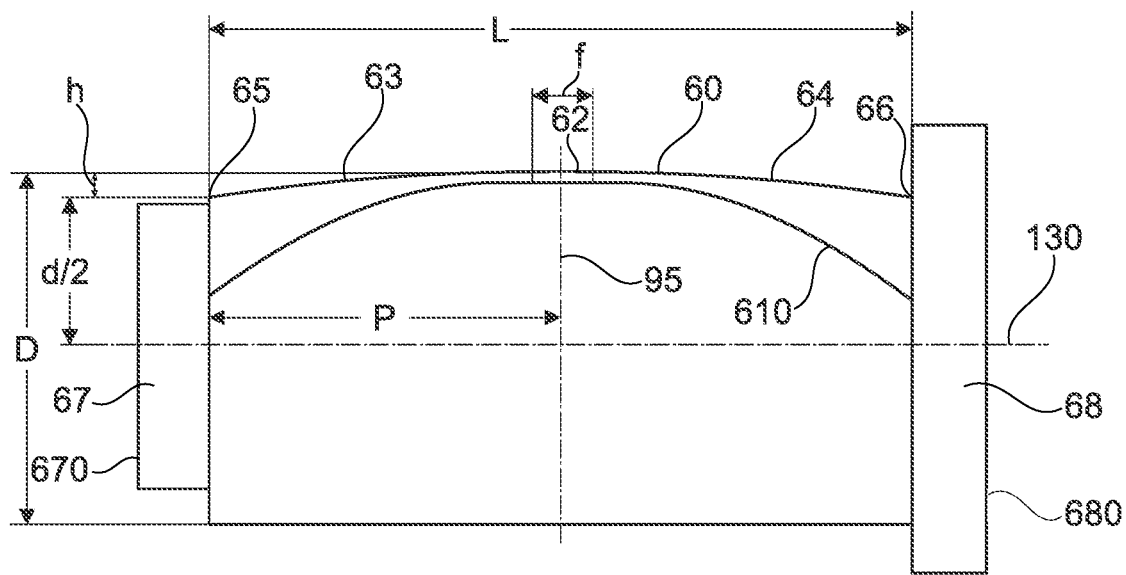
FIG. 17 shows a side view of the planet pin of FIG. 16.

In the circumferential area in which the planet pin 6 forms a crowning, the maximum outer diameter D is realized at the axial center 95 of the planet pin 6, and in a cylindrical area 62 of the axial length f about this axial center 95, cf. FIG. 17. However, this is not necessarily the case. Alternatively, it can for example be provided that the maximum of the outer diameter D is realized only along a circumferential line or outside the axial center 95.

The axial distance between the axially forward end 65 of the abutment surface 60 to the maximum of the outer diameter D or, if the maximum is formed in a cylindrical area, to the center of this cylindrical area, is indicated by P in FIG. 17. Due to the symmetrical design of the abutment surface 60, P is located in the axial center 95 of the abutment surface in FIG. 17.

In the circumferential area in which the planet pin 6 forms a crowning, the abutment surface 60 of the planet pin 6 forms a first convex curve 63 in the longitudinal section that extends between the cylindrical area 62 and the forward axial end 65, as well as a second convex curve 64 that extends between the cylindrical area 62 and the rearward axial end 66. In general, the curves 63, 64 can have any desired shape. For example, the curves may be formed in a circular, parabolic or rectilinear manner.

The planet pin 6 has axial elongations or ends 67, 68, which respectively form a forward axial face side 670 of the planet pin 6 and a rearward axial face side 680 of the planet pin. As has been explained with respect to FIGS. 2 to 5, it can be provided that the planet pin 6 is respectively attached at a support plane at these ends 67, 68. In the exemplary embodiment of FIGS. 15 to 20, the ends 67, 68 are designed differently. Alternatively, they can be embodied in an identical manner.

In the circumferential area in which the planet pin 6 forms a crowning, it realizes certain ratios of the parameters h, P, L and D, a defined above. These ratios can be embodied corresponding to the ratios described with respect to FIG. 6.

Figure 18:
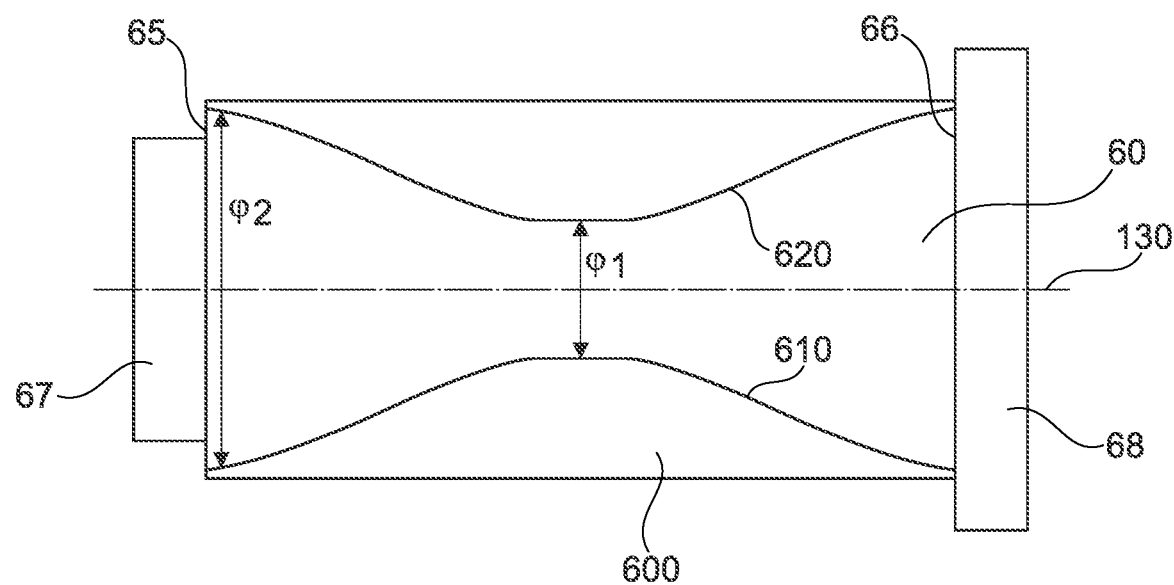
FIG. 18 shows a top view of the planet pin of FIG. 16.
Figure 19:
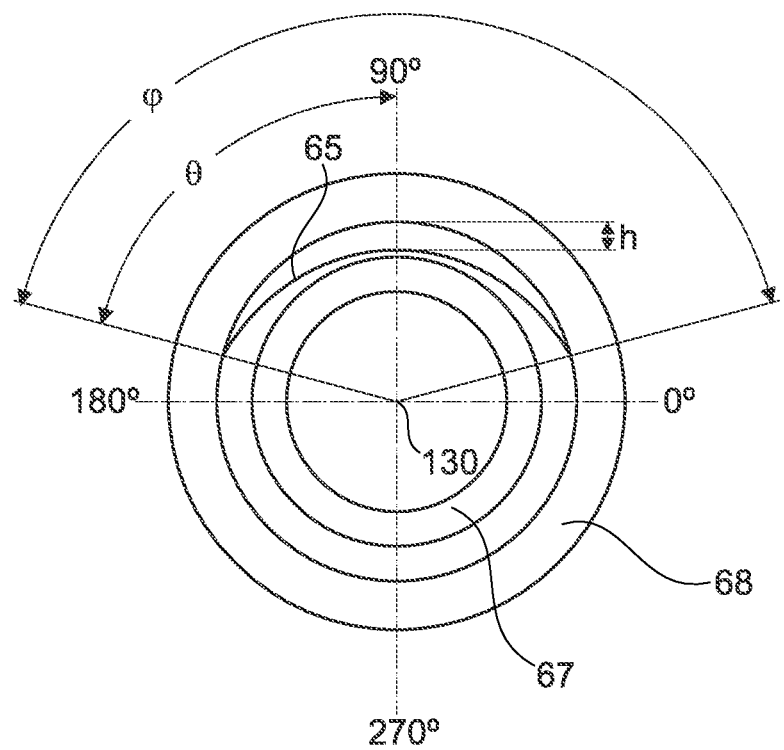
FIG. 19 shows a view from the left of the planet pin of FIG. 16, wherein the view contains a first parameterization with respect to the abutment surface with the crowned design.
Figure 20:
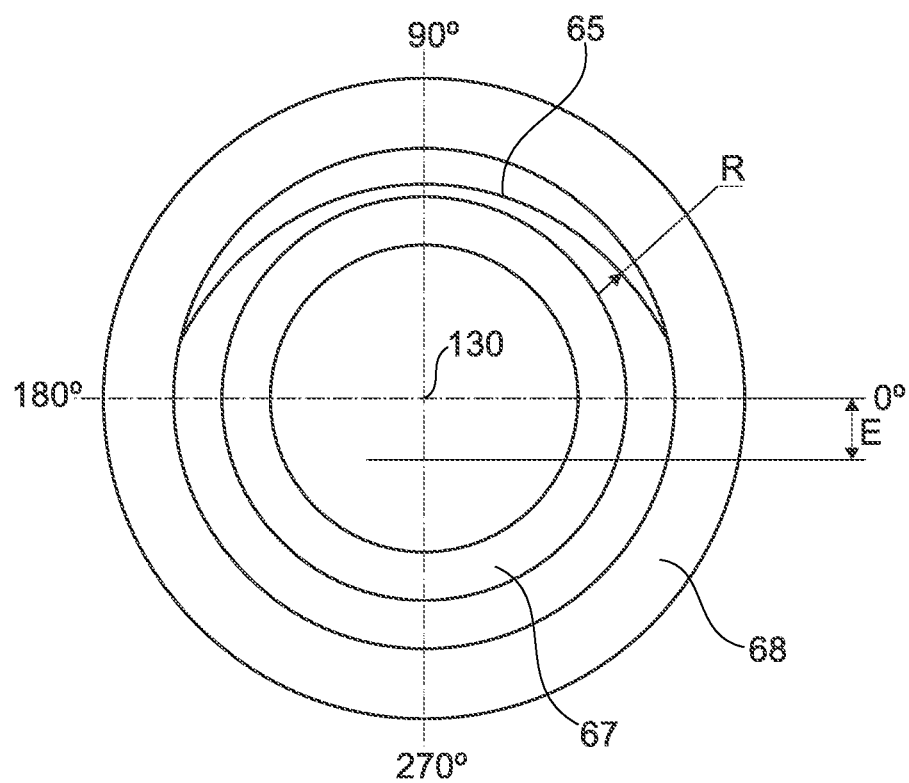
FIG. 20 shows a view from the left of the planet pin of FIG. 16, wherein the view contains a second parameterization with respect to the abutment surface with the crowned design.

In the following, the shape and extension circumference of the crowned abutment surface 60 are described in more detail in the exemplary embodiment of FIGS. 15 to 20. Here, FIG. 19 shows a first parameterization and FIG. 20 shows a second parameterization for describing the geometry of the abutment surface 60 with the crowned design. However, these parameterizations are to be understood merely as examples. At first, the parameterization of FIG. 19 is regarded.

Thus, according to FIG. 19, the angle φ indicates the circumferential angle across which the crowned area is formed in the circumferential direction. Here, it can be seen from FIGS. 15, 16 and 18 that, in the shown exemplary embodiment, the circumferential angle φ is not constant in the circumferential direction, but varies depending on the axial position between the two ends 65, 66. In other exemplary embodiments, it can be provided that the extension area in the circumferential direction or the angle φ is constant.

Here, the variation of the extension of the abutment surface 60 with the crowned design in the circumferential direction is such that the abutment surface 60 with the crowned design extends at the axial ends 65, 66 of the abutment surface 60 across a greater circumferential angle φ than in the area 62 of the maximum outer diameter D. Thus, in the cylindrical area 62 having a constant outer diameter, the abutment surface 60 with the crowned design has an abutment surface 60 with the crowned design that extends across a minimum circumferential angle φ1, cf. FIG. 18. Starting from this minimum circumferential angle φ1, the circumferential angle φ continuously increases towards the axial ends 65, 66 of the abutment surface 60 to a maximum circumferential angle φ2. Accordingly, the two boundary lines 610, 620 of the abutment surface 60 with the crowned design have a minimum distance in the area 62 of the maximum outer diameter D, and a maximum distance at the axial ends 65, 66. The boundary lines 610, 620 are respectively formed to be symmetrical with respect to the axial center 95. Further, the boundary lines 610, 620 are formed to be mirror-symmetrical with respect to a straight line that extends in between them in the axial direction (and which, in the rendering of FIG. 18, is located on the central axis 130 in the projection from above).

Further, an angle θ is indicated in FIG. 19, indicating the orientation of the crowned area within the angular range of between 0 and 360°, wherein it usually applies that θ=½φ. While thus the angle φ indicates the shape of the crowned area in the circumferential direction, the angle θ indicates the spatial orientation. If for example the angle φ is 120°, it can be indicated through the angle θ that the angle φ for example extends in the angular range of between 180° and 240°, that is, in the third quarter)(180°≤θ≤240°, wherein the angle θ is measured in the mathematically positive direction of rotation, and the x-axis of the Cartesian coordinate system defines the angle 0°. Generally, it applies that the crowning can be oriented in any desired way along the circumference, and depends on the installation position.

FIG. 19 shows the height h of the crowning as a further parameter. As such, FIGS. 17 and 6 are also referred to. Here, FIG. 19 shows that the height h of the crowning is not a constant, but rather decreases with growing distance from the center between the two boundary lines 610, 620 towards the boundary lines 610, 620. In this way, it is achieved that the transition between the cylindrical area 600 of the planet pin 6 and the crowned area 60 occurs without any sudden change in thickness. The boundary lines 610, 620 only represent light edges that indicate the transition from the crowned area to the cylindrical area.

The angle φ may for example be in the range of between 10° and 350°. In particular, this angle can be in the range of between 10° and 180°. For example, it may be in the range of between 10° and 120°, in particular in the range of between 30° and 80°. Here, the angular difference between φ1 and φ2 can for example be in the range of between 10° and 120°, in particular in the range of between 40° and 80°.

If the angle φ is smaller that 180°, also more than one abutment surface 60 with the crowned design can be realized in the circumferential direction.

Like FIG. 19, FIG. 20 shows the planet pin 6 in a front view from the left. Only one differing parameterization is indicated. Thus, the parameterization occurs via the radius R of the crowning in the circumferential direction at the axial ends 65, 66 in connection with an eccentricity E. The eccentricity indicates the distance between the central axis of the parameter "radius" and the central axis of the pin. The greater the height h of the crowning, the smaller the bent in the circumferential direction at the ends 65, 66, the larger the radius of the associated circle, and correspondingly also the greater the eccentricity E. The eccentricity E is thus a parameter for the crowning of the abutment surface 60 of the planet pin 6.

Here, it is to be understood that the radius R is constant in the circumferential direction. The radius R varies only in the axial direction. Thus, the radius is largest in the cylindrical area 62 with a constant outer diameter, and decreases towards the axial ends 65, 66.

Alternatively, it can be provided that the radius R is maximal in the center between the two boundary lines 610, 620 (in FIG. 20 on the 90° axis) and successively decreases towards the boundary lines 610, 620 until the radius of the cylindrical area 600 is reached. In this manner, a tangential transition between the areas 60 and 600 is achieved. Such a tangential transition is not present in the case of a constant radius R in the circumferential direction.

To be precise, the parameterization via the radius R and the eccentricity E accordingly only applies in the center between the two boundary lines 610, 620.

In general, it applies to the radius R that it is larger or equal to D/2, cf. FIG. 17, wherein the radius R decreases towards the axial ends 65, 66.

The variations of the crowning of the planet pin 6 as described with respect to FIGS. 6 to 12 can also be realized in the same manner at the crowned area of the planet pin 6 of FIGS. 15 to 20.

Figure 11:
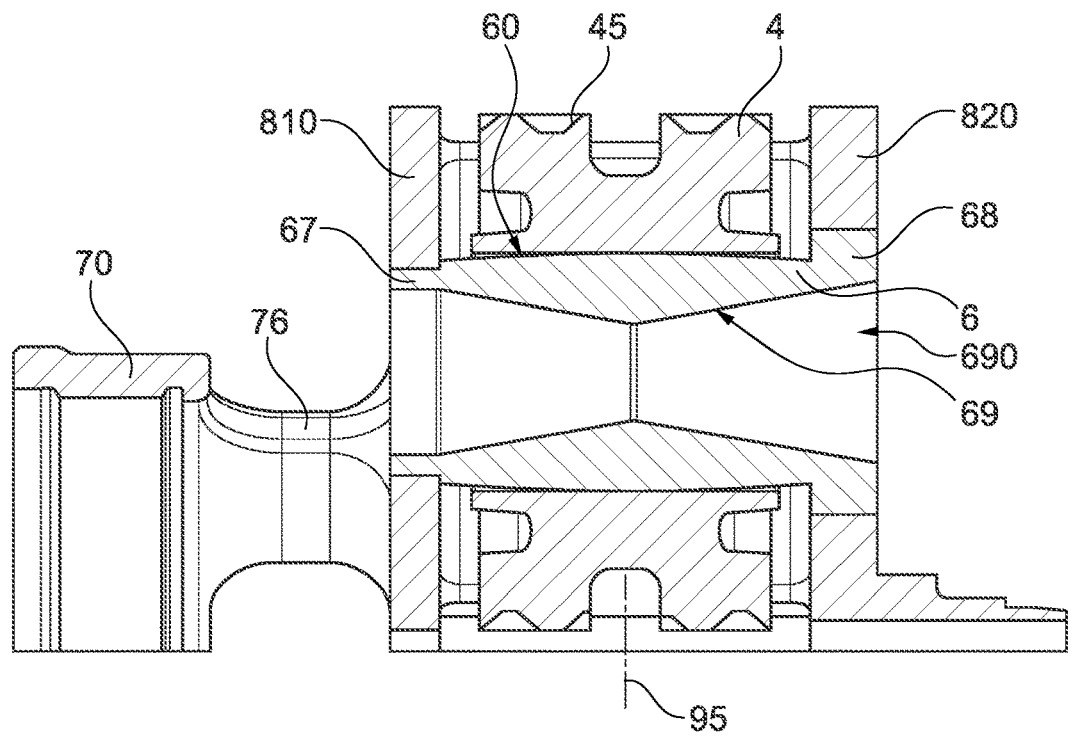
FIG. 11 shows a partially sectioned rendering of a planet pin that is arranged in a planetary gearing according to FIGS. 4 and 5.

FIG. 11 shows another exemplary embodiment of a planet pin 6 that forms a slide bearing with a planet gear 4 with an outer toothing 45. The planet pin 6 is fixedly connected to a structure which, correspondingly to the exemplary embodiment of FIGS. 4 and 5, consist of a forward support plate 810, a rearward support plate 820, and a torque carrier 70. For this purpose, the planet pin 6 comprises a first axial elongation 67 that is attached inside the forward support plate 810 and a second axial elongation 68 that is attached inside the rearward support plate 820.

The torque carrier 70 is fixedly connected to the forward support plate 810 by means of connecting webs 76. With regards to this, the description of FIGS. 4 and 5 is referred to.

The planet pin 6 has an abutment surface 60 that is formed in a crowned manner, as has been explained with respect to FIG. 6. Further, the planet pin 6 has an inner surface 69 to the axial bore 690 that has a shape that differs from the cylindrical shape. Thus, the bore 690 is formed in a double conical manner, wherein the inner diameter of the bore 690 has a minimum in the axial center 95 of the planet pin 6 and a maximum towards the two axial ends. In other exemplary embodiments, the bore 690 is formed in a cylindrical manner.

Figure 12:
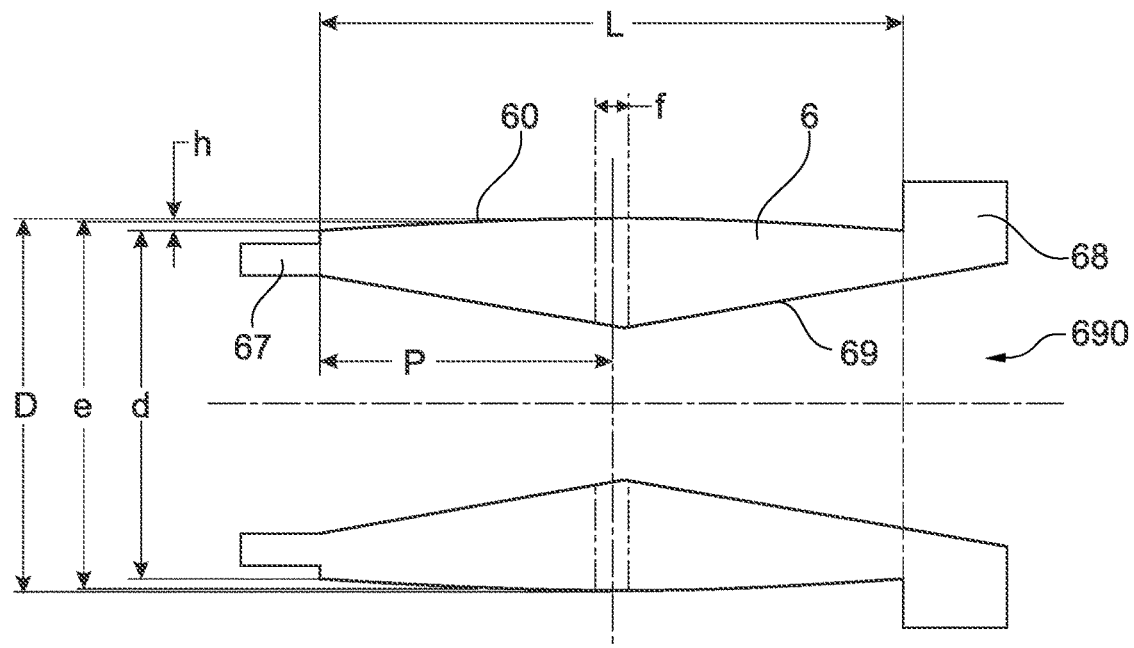
FIG. 12 shows the planet pin of FIG. 11 in an enlarged sectioned rendering.

FIG. 12 shows an enlarged rendering of the planet pin 6 of FIG. 11, wherein, in a manner corresponding to the rendering of FIG. 6, the parameters D, d, e, f, h, P and L relevant for the configuration of the planet pin 6 indicated therein are also shown. As for the definition of these parameters, the description of FIG. 6 is referred to. In contrast to FIG. 6, it is assumed only that the minimum outer diameter of the planet pin 6 is identical at the two axial ends, so that this parameter is indicated by d (without any differentiation between d1 and d2, and correspondingly also without any differentiation between h1 and h2).

Apart from the differing shape of the inner surface 69 of the planet pin 6, the planet pin 6 of FIGS. 11 and 12 differs from the planet pin of FIG. 6 in that it has a differing design of the forward axial end 67 and of the rearward axial end 68 of the planet pin 6, which, according to FIGS. 11 and 12, are provided and formed for being attached in support plates 810, 820 formed in one piece with the torque carrier 70. Here, the two axial ends 67, 68 can have different shapes, as shown in FIGS. 11 and 12.

Figure 13:
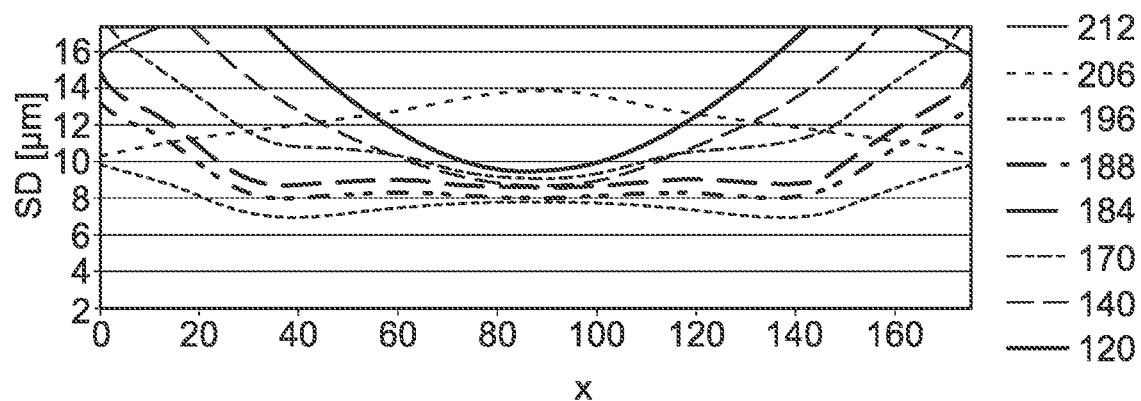
FIG. 13 shows the lubricating film thickness of a slide bearing depending on the axial position of the slide bearing for a planet pin with an abutment surface designed with a crowning.
Figure 14:
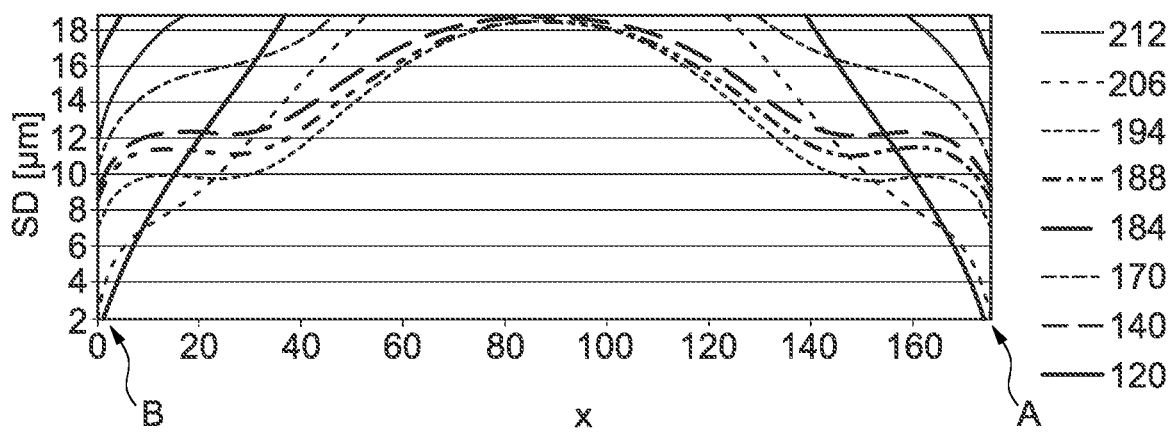
FIG. 14 shows the lubricating film thickness of a slide bearing depending on the axial position of the slide bearing for a cylindrically formed planet pin.
Figure 15:
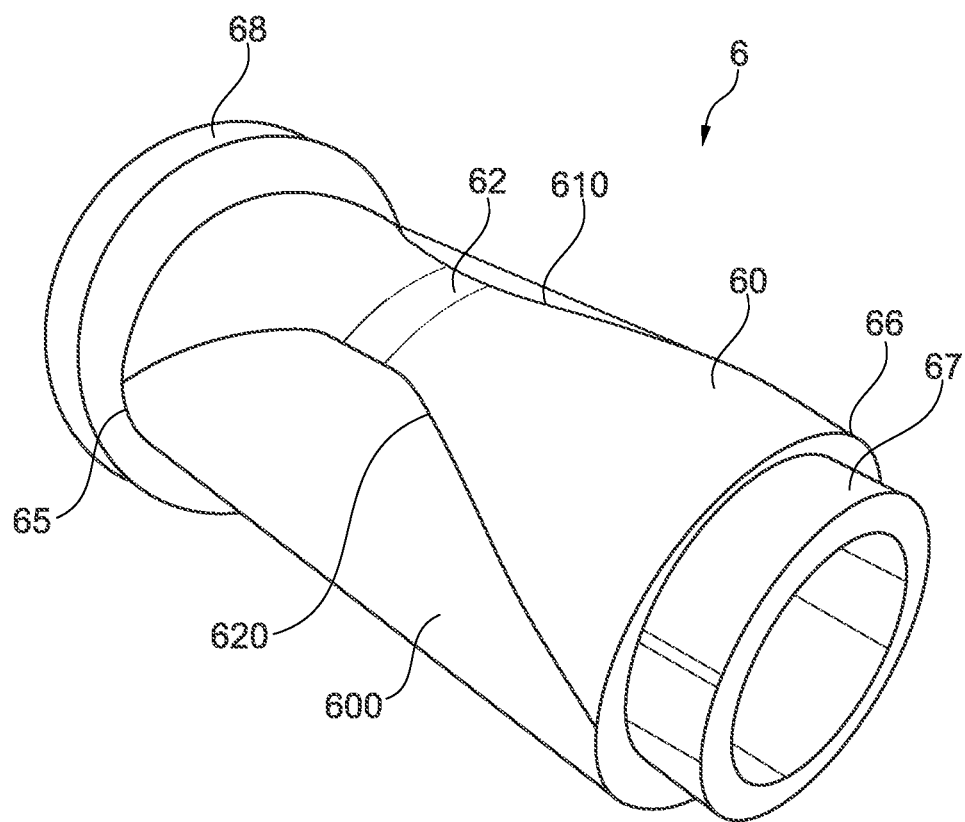
FIG. 15 shows, in a perspective rendering, a further exemplary embodiment of a planet pin, wherein the planet pin realizes an abutment surface with a crowned design across a circumferential angle of less than 360°.
Figure 16:
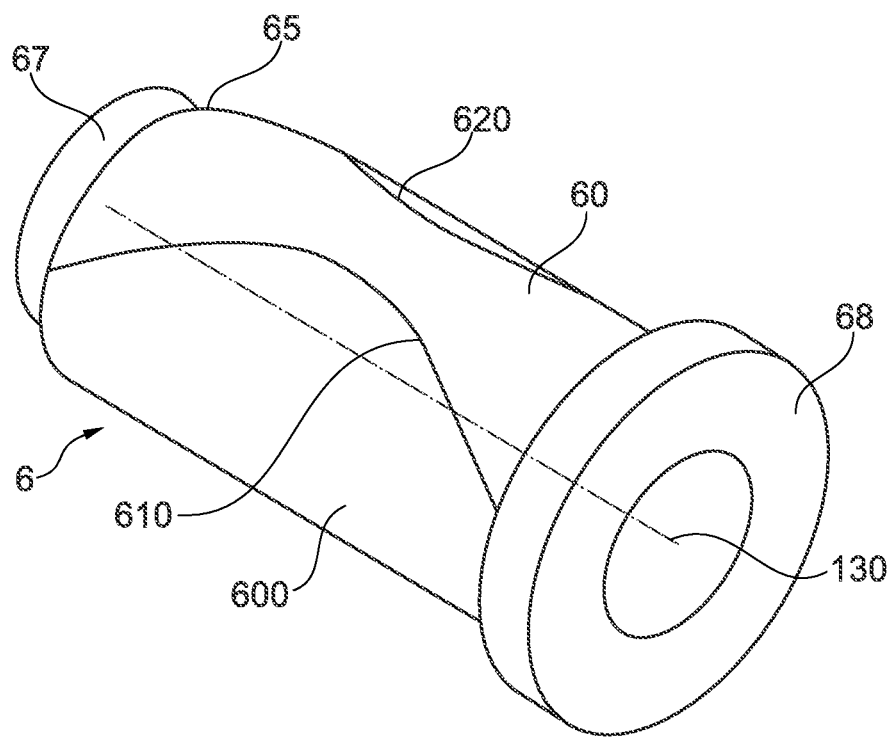
FIG. 16 shows a perspective rendering of the exemplary embodiment of FIG. 15, rotated by 180°.

The advantages associated with the invention are illustrated in FIGS. 13 and 14, which respectively show the lubricating film thickness of the slide bearing depending on the axial position of the slide bearing. Here, FIG. 14 shows the conditions at a planet pin, which has a purely cylindrically shaped surface that is not provided with a crowning, at 80% loading. It can be seen that the lubricating film thickness strongly decreases towards the axial ends (cf. arrows A, B), which leads to an increased lubrication film thickness and the danger of a metal-on-metal contact between the planet pin and the planet gear.

FIG. 13 shows the lubricating film thickness of the slide bearing depending on the axial position of the slide bearing for a planet pin, which has a surface provided with a crowning, at 100% loading. A sufficient lubricating film thickness is ensured also at the axial ends.

The present invention is not limited in its design to the above-described exemplary embodiments. In particular, the described specific shapes of the planet gear 4 and of the planet pin 6 are to be understood merely as examples.

Further, it is to be understood that the features of the individual described exemplary embodiments of the invention can be combined with each other in different combinations. As far as ranges are defined, they comprise all values within this range, as well as all partial ranges that fall within a range.

The invention claimed is:

1. A planetary gearing, comprising:
    a sun gear rotatable about a rotation axis of the planetary gearing and driven by a sun shaft, wherein the rotation axis defines an axial direction of the planetary gearing,
    a plurality of planet gears that are driven by the sun gear,
    a ring gear with which the plurality of planet gears is in engagement,
    a plurality of planet pins which respectively have an outer-side abutment surface comprising an axially forward end and an axially rearward end, wherein
    respectively one planet pin of the plurality of planet pins is arranged inside a planet gear, and the planet pin and the planet gear form a lubricated journal bearing,
    the abutment surface being crowned with an outer diameter decreasing from a maximum outer diameter towards at least one chosen from the axially forward end and the axially rearward end and having at least one minimum outer diameter at the at least one chosen from the axially forward end and the axially rearward end, the at least one minimum outer diameter including axially forward and axially rearward minimum outer diameters positioned respectively at the axially forward end and the axially rearward end, the maximum outer diameter being positioned between the axially forward end and the axially rearward end, the axially forward and the axially rearward minimum outer diameters being different.

2. The planetary gearing according to claim 1, wherein the planet pin has minimum outer diameters at the axially forward end and the axially rearward end and the maximum outer diameter between the axially forward end and the axially rearward end, wherein the minimum outer diameters are identical on both the axially forward end and the axially rearward end.

3. The planetary gearing according to claim 1, wherein a difference between the maximum outer diameter and the outer diameter at an axial position of the planet pin continuously increases towards at least one chosen from the axially forward end and the axially rearward end.

4. The planetary gearing according to claim 1, wherein, in a longitudinal section, the abutment surface forms a first convex curve extending between the maximum outer diameter and the axially forward end, and forms a second convex curve extending between the maximum outer diameter and the axially rearward end.

5. The planetary gearing according to claim 4, wherein at least one chosen from the first convex curve and the second convex curve is formed in at least one chosen from a circular manner and a parabolic manner.

6. The planetary gearing according to claim 4, wherein the at least one chosen from the first convex curve and the second convex curve includes multiple curve portions, wherein at least one of the multiple curve portions is formed in a rectilinear manner.

7. The planetary gearing according to claim 4, wherein the maximum outer diameter is formed by a single circumferential line.

8. The planetary gearing according to claim 7, wherein the first convex curve and the second convex curve transition steadily into each other.

9. The planetary gearing according to claim 1, wherein the maximum outer diameter is formed by a cylindrical area with a constant outer diameter extending over a defined axial length.

10. The planetary gearing according to claim 9, wherein a ratio of the defined axial length of the cylindrical area to an axial total length of the abutment surface is between 0 and 0.75.

11. The planetary gearing according to claim 1, wherein the maximum outer diameter is positioned at an axial center of the planet pin.

12. The planetary gearing according to claim 1, wherein the maximum outer diameter is positioned outside of an axial center of the planet pin.

13. The planetary gearing according to claim 1, wherein a ratio of half a difference between the maximum outer diameter and the minimum outer diameter to the maximum outer diameter is between 0.00005 and 0.005.

14. The planetary gearing according to claim 1, wherein the abutment surface with the crowned configuration extends only across a circumferential angle ($\varphi$) of the planet pin that is smaller than 360°.

15. The planetary gearing according to claim 14, wherein the circumferential angle ($\varphi$) across which the abutment surface with the crowned configuration extends varies in the axial direction.

16. The planetary gearing according to claim 14, wherein the abutment surface with the crowned configuration extends at the maximum outer diameter across a minimal circumferential angle ($\varphi 1$), and the circumferential angle ($\varphi$) continuously increases from the maximum outer diameter towards the axially forward end and the axially rearward end to a maximum circumferential angle ($\varphi 2$), so that the abutment surface with the crowned configuration extends at the axially forward end and the axially rearward end across a greater circumferential angle ($\varphi 2$) than in an area of the maximum outer diameter.

17. The planetary gearing according to claim 1, wherein the one planet pin is formed as a monolithic single piece.

18. A pin for a planetary gearing, comprising:
an outer-side abutment surface for a slide bearing, wherein the abutment surface includes an axially forward end and an axially rearward end,
the abutment surface being crowned with an outer diameter decreasing from a maximum outer diameter towards at least one chosen from the axially forward end and the axially rearward end and having at least one minimum outer diameter at the at least one chosen from the axially forward end and the axially rearward end,
the at least one minimum outer diameter including axially forward and axially rearward minimum outer diameters positioned respectively at the axially forward end and the axially rearward end, the maximum outer diameter being positioned between the axially forward end and the axially rearward end, the axially forward and the axially rearward minimum outer diameters being different.

19. A gear fan engine, comprising:
a fan stage,
a fan shaft via which the fan stage is driven,
a turbine shaft,
wherein the turbine shaft and the fan shaft are coupled via the planetary gearing according to claim 1, wherein the turbine shaft forms the sun shaft, the planet pins are coupled to a torque carrier, and the torque carrier is coupled to the fan shaft.

20. A planetary gearing, comprising:
a sun gear rotatable about a rotation axis of the planetary gearing and driven by a sun shaft, wherein the rotation axis defines an axial direction of the planetary gearing,
a plurality of planet gears that are driven by the sun gear,
a ring gear with which the plurality of planet gears is in engagement,
a plurality of planet pins which respectively have an outer-side abutment surface comprising an axially forward end and an axially rearward end, wherein
respectively one planet pin of the plurality of planet pins is arranged inside a planet gear, and the planet pin and the planet gear form a lubricated journal bearing,
the abutment surface being crowned with an outer diameter decreasing from a maximum outer diameter towards at least one chosen from the axially forward end and the axially rearward end and having at least one minimum outer diameter at the at least one chosen from the axially forward end and the axially rearward end,
wherein the abutment surface with the crowned configuration extends only across a circumferential angle ($\varphi$) of the planet pin that is smaller than 360°.

* * * * *